United States Patent [19]

Jerger et al.

[11] Patent Number: 4,793,192

[45] Date of Patent: Dec. 27, 1988

[54] ELECTROMAGNETIC PULSE RECEIVER FOR A FLOW METER

[75] Inventors: Walter Jerger, Mannheim; Jürgen Böhm, Mannheim-Wallstadt, both of Fed. Rep. of Germany

[73] Assignee: Bopp & Reuther, Mannheim, Fed. Rep. of Germany

[21] Appl. No.: 926,405

[22] Filed: Oct. 30, 1986

[30] Foreign Application Priority Data

Oct. 30, 1985 [DE] Fed. Rep. of Germany ....... 3538514

[51] Int. Cl.$^4$ ........................ G01P 3/487; G01F 1/075
[52] U.S. Cl. .................................. 73/861.78; 324/174
[58] Field of Search ................ 73/861.78, 861.77, 253, 73/261, 273; 324/173, 174, 207, 208, 262

[56] References Cited

U.S. PATENT DOCUMENTS

| | | | |
|---|---|---|---|
| 3,636,767 | 1/1972 | Duffy | 73/861.77 |
| 4,321,495 | 3/1982 | Kennedy | 324/174 |
| 4,553,433 | 11/1985 | Hicks | 73/861.77 |
| 4,579,008 | 4/1986 | Böhm et al. | 73/861.78 |
| 4,689,557 | 8/1987 | Smith et al. | 324/174 |

OTHER PUBLICATIONS

Gerald M. Walker, "Wiegand's Wonderful Wires", Popular Science, May 1979, pp. 102-104, 165, CL 73-861.77.

Primary Examiner—Joseph A. Orsino
Assistant Examiner—Brent A. Swarthout
Attorney, Agent, or Firm—Michael J. Striker

[57] ABSTRACT

An electromagnetic pulse receiver for a flow meter, comprises a measuring wheel element to be driven in rotation by a flowing medium, a stationary axle which rotatably supports the measuring wheel element and is at least partially formed as a hollow axle with a cylindrical hollow space, a pulse wire sensor arranged in the cylindrical hollow space of the hollow axle and formed as a cylindrical probe, the probe having a probe head which carries a plurality of cylindrically arranged pulse wires, a receiver coil, and a cylindrical magnet yoke concentrically located inside the receiver coil, the probe also having an outwardly extending probe shaft with inwardly located electrical pulse conductors and an outwardly located holding element for holding the probe shaft, and a magnet device including at least one pair of magnets located near the hollow axle in the measuring wheel element, the magnet pair extending in a direction parallel to the hollow axle and magnetized in the direction with opposite polarity so as to encircle the probe head during the rotation of the measuring wheel element.

10 Claims, 6 Drawing Sheets

ELECTROMAGNETIC PULSE RECEIVER FOR A FLOW METER

BACKGROUND OF THE INVENTION

The present invention relates to an electromagnetic pulse receiver for a flow meter particularly of great nominal width.

More particularly, it relates to an electromagnetic pulse receiver for a flow meter, in which a measuring wheel which rotates in a measuring chamber carries a magnet device, and a sensor operating in accordance with the Wiegand principle is located outside of a pressure chamber and provided with a plurality of pulse wires which are arranged on a cylindrical outer surface and extend in a longitudinal direction. During rotation of the measuring wheel magnetic pulses are produced and converted in a receiver coil located inside the pulse wires into electrical voltage pulses. The number of these electrical pulses is indicative of a quantity of a medium which flows through a flow meter and is to be measured.

An electromagnetic pulse receiver for a flow meter with smaller nominal width is disclosed for example in the German document DE-OS No. 3,321,952. In this electromagnetic pulse receiver the pulse wires with the receiver coil are arranged in a recess of an end wall of a measuring chamber. Because of this end-side arrangement of the pulse wire sensor, even in the event of minimum counter width a great receiver cylinder having a sufficient diameter is provided which can accommodate a plurality of pulse wires and thereby enables a high resolution in small partial volume. When this principle is used for a counter having a greater nominal width, the receiver cylinder must be made with a greater diameter in correspondence with increased diameter of the measuring wheel. As a result of this, the pulse receiver becomes too expensive and requires too much space. Moreover, the end wall of the measuring chamber which is penetrable by the magnetic field of the magnet arranged in the measuring wheel must have a thick wall because of the increased diameter of the receiver, to provide a sufficient strength. Therefore, the distance between the magnet and the pulse wires becomes too great and as a result of this an unobjectionable operation of the receiver is more difficult or impossible.

SUMMARY OF THE INVENTION

Accordingly, it is an object of the present invention to provide an electromagnet pulse receiver for a flow meter which avoids the disadvantages of the prior art.

More particularly, it is an object of the present invention to provide a pulse receiver for a flow meter especially for greater nominal width, which is simple and space-economical and in which, regardless of the nominal width, a small distance between the measuring wheel magnet and the pulse wires is provided so that always a reliable pulse generation and a substantially error-free quantity measurement are guaranteed.

In keeping with these objects and with others which will become apparent hereinafter, one feature of the present invention resides, briefly stated, in that the measuring wheel is supported on a stationary axle which is formed as a hollow axle, and pulse wire sensor formed as a cylindrical probe is arranged in the hollow space of the hollow axle, the probe has a probe head with cylindrically arranged pulse wires, a receiver coil, and a cylindrical magnet yoke concentrically arranged inside the coil, the probe also has a probe shaft extending outwardly and having pulse conductors inside the probe shaft and a holding element outside the probe shaft for fixing the probe to a counter housing, and a magnet device includes at least one pair of magnets located in the vicinity of the hollow axle inside the measuring wheel or inside a rotor which is driven by the measuring wheel so that the magnet pair extends parallel to the hollow axle and is magnetized in this direction with opposite polarity so as to encircle the probe head during the rotation of the measuring wheel.

Since the cylindrical probe is located inside the hollow axle which supports the measuring wheel, the pulse receiver can be located inside the measuring wheel axle in a smallest space and inserted in a simple manner from the open side of the hollow axle. Therefore, no additional space is required for the arrangement of the pulse receiver. Since the pulse receiver is now located in the interior of the measuring wheel, it is better protected against magnetic disturbing field than pulse receivers located outside the measuring wheel.

The probe carries on its probe head a plurality of cylindrically arranged pulse wires or a pulse wire cylinder, the receiver coil and the magnetic yoke which is concentrically located inside a hollow space of the coil. Thereby the sensor can be formed and built in a simple manner. Because of this cylindrical magnetic yoke an influence of the magnetic field is performed so that the magnetic field provided between the respective magnet and the magnet yoke has an especially strong change with the rotary angle in the region of the pulse wires by deflection inwardly and therefore by a respective concentration. Thereby an exact operation of the pulse wires is provided.

The probe shaft of the pulse wire sensor serves for protected accommodation of the electrical pulse conductors and simultaneously carries a holding element which is used for fixing the probe with a desired insertion depth to the counter housing in a simple manner. The magnet device includes here two magnets which are located in the vicinity of the hollow axle in the measuring wheel, extend parallel to the hollow axle, and have opposite polarity which encircles the probe head during the rotation of the measuring wheel and acts upon the pulse wires with magnetic fields of alternating direction so as to release the pulse in the pulse wire sensor.

The invention can be used in an especially simple manner for flow meters which include a measuring wheel rotatably supported on a stationary hollow axle and having an annular chamber for insertion of a magnetic coupling half. For arranging another magnetic coupling half which is seated on a drive shaft for the counter, the inner chamber of the hollow axle is provided. In correspondence with the features of the invention, the annular chamber which was used for one magnetic coupling half is used for insertion of respective magnets which act upon the pulse wire sensor, and the inner chamber of the hollow axle which was used for the other magnetic coupling half is used for insertion of the probe. Therefore, with using of the prefabricated assembly principle, the flow meter can be equipped without high mechanical efforts, either with magnetic transmission of the measuring wheel revolutions and direct indication, or instead of this mechanical transmission with an electromagnetic pick up of the measuring wheel movement with remote transmission of the throughflow pulses.

The annular space in the measuring wheel which was used for the magnetic coupling half can be used in accordance with the present invention in a simple manner for accommodating a magnetic ring which is magnetized in an axis-parallel direction and includes at least one or several zone pairs. The zone pair forms the above mentioned magnet pair and is magnetized alternatingly in opposite direction and with different strength.

In accordance with a further feature of the present invention, the probe shaft is provided with a plurality of annular grooves having different depth. Depending upon a type and a width of the counter, a safety ring is inserted in respective one of the annular grooves so that it abuts against a projection of the hollow axle and held in the respective groove by screwing. In this case the probe can be used for different nominal widths and different throughflow diameters, so that the pulse receiver can be manufactured less expensive in high numbers.

In accordance with still a further feature of the present invention, when the hollow axle has a greater diameter, a centering bush can be used for insertion of the probe. The centering bush is fitted on the probe shaft and fixed by a safety ring insertable into a holding groove. Thereby the probe can be used as a unitary probe also in hollow axles with different inner diameters.

In the event of temperature fluctuations of the medium to be measured, a temperature compensation can be provided for avoiding errors in quantity measurements. For this purpose in addition the volume determination by means of the pulse wire sensor, a temperature sensor must be provided for determination of the medium temperature in the measuring chamber. In accordance with the invention a temperature sensor is arranged in the interior of the pulse wire sensor formed as the probe. The signal conduit of the temperature sensor together with the signal conduit of the probe extend outwardly so that it is not necessary to provide a special receiving pocket for the temperature sensor in the housing of the counter. Moreover, the temperature sensor is integrated in a simple and space-economical manner in a sensor of the flow meter which is favorable for the measurements.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
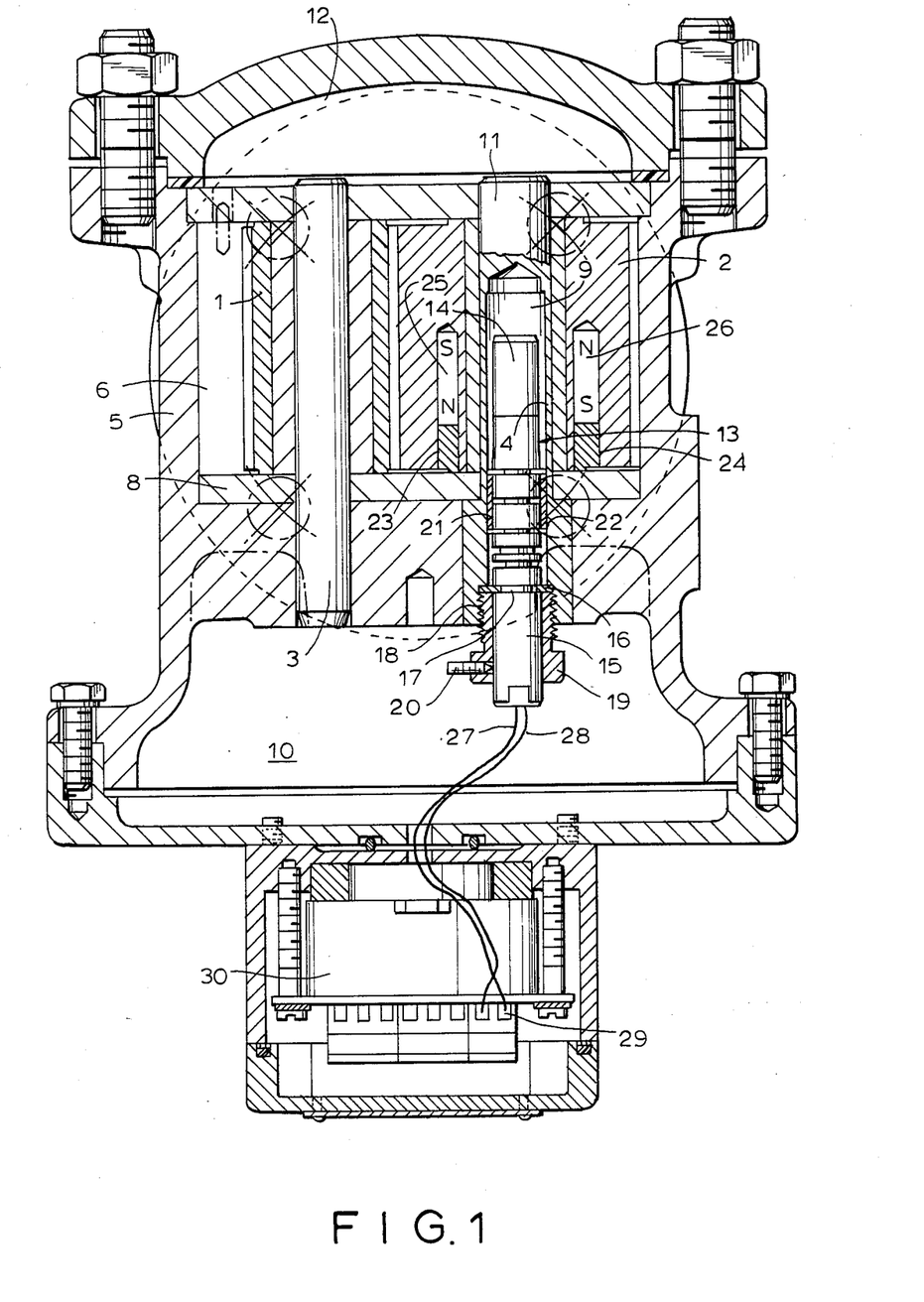
FIG. 1 is a view showing an oval wheel counter in a longitudinal section, with a probe arranged in the hollow axle of an oval wheel, in accordance with the present invention.

An oval wheel counter shown in FIG. 1 has two measuring wheels 1 and 2 with a plurality of teeth which mesh with one another. The measuring wheels 1 and 2 are supported on fixed axles 3 and 4 and run in a measuring chamber which is formed in a housing 5. The measure chamber 6 is closed at both end sides of the measuring wheels I and 2 by end plates 7 and 8.

The axle 4 is formed as a hollow axle with a space 9 which freely opens into a pressureless housing chamber 10. At the other side, it is closed by a closed axle end 11 from a cover chamber 12 which is under operative pressure. A pulse wire sensor 13 which is formed as a probe is inserted in the inner space 9 of the hollow axle 4. The probe 13 has a probe head 14 with pulse wires, a receiver coil and a magnet yoke. In the lower region it is formed as a probe shaft 15 with a holding element 16 for fixing the probe 13 in the hollow axle 4.

The holding element 16 is formed as a safety ring which, depending upon the counter design and the counter size, is inserted in a fixing groove 17 of the probe shaft 15. The hollow axle 4 carries at its open end a projection 18 provided with an inner thread. A holding screw 19 which tightens the safety ring 16 and thereby fixes the probe 13 is inserted in the projection 18. The holding screw 19 is provided with a headless screw 20 which arrests an angular position of the probe 13. The probe 13 is formed as a unitary probe for insertion into hollow axles of flow meters with different inner diameters. In the event of insertion of the same into a hollow axle with a greater inner diameter a centering bush 21 is fitted on the probe shaft 15. The centering bush 21 is fixed on the probe shaft 15 by a further safety ring 22 inserted in a holding groove 17.

The measuring wheel 2 of the flow meter rotating about the axle 4 is provided with two axis-parallel openings 23 and 24. Oppositely magnetized bar magnets 25 and 26 are inserted in the openings 23 and 24. The bar magnet 26 is greater than the bar magnet 25 and generates a stronger magnetic field than the bar magnet 25. Both magnet fields are directed opposite to one another. The inner space of the probe shaft 15 is hollow and serves for guiding therethrough of pulse conductors 27 and 26 connected with the receiver coil. The conductors 26 and 27 supply the electrical pulses produced by the pulse wires via connecting terminals 29 to an amplifier 80. The probe head 14 shown in FIG. 2 includes a hollow cylindrical base body 31 which carries in its front region a receiver coil 32. The receiver coil 32 is surrounded by a magnetically non-conductive sleeve 88. The sleeve 38 is provided with longitudinal grooves distributed over its periphery and accommodating pulse wires 34 which are glued in the grooves. A tubular magnet Yoke 35 is inserted in the base body 31 inside the receiver coil 82. It is secured at its free end by a plug 36 which is composed of a synthetic plastic material and also fixes the sleeve 88. The inner space of the magnet yoke 35 and the plug yoke is filled with a sealing mass 87 which forwardly holds the plug 36 and embeds on the probe shaft 15 the pulse conduits 27 and 28. Connecting wires 88 and 89 of the receiver coil 32 and also solder supporting points 40 and 41 are embedded by an outer sealing mass 42 on the probe head 14.

Figure 2:
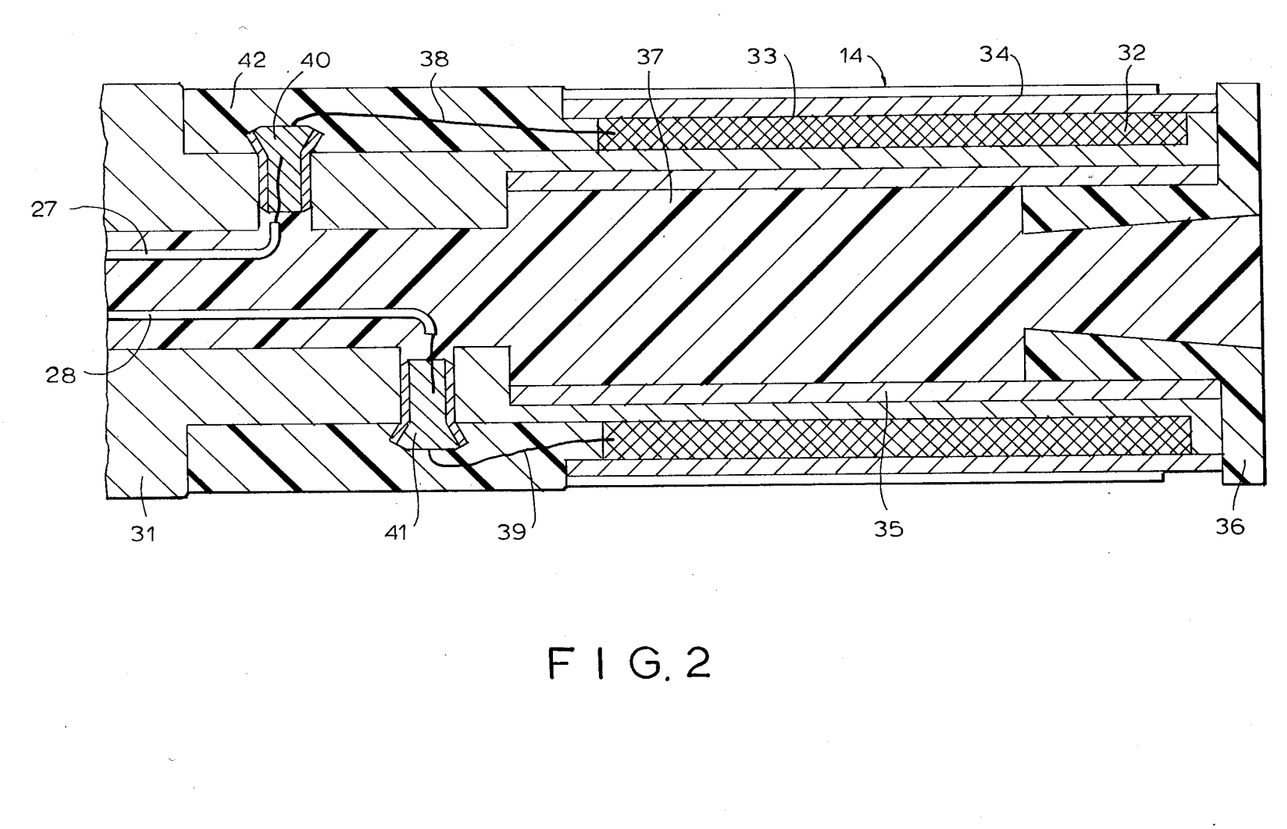
FIG. 2 is a view showing a head of the probe of FIG. 1 on an enlarged scale.

The pulse receiver shown in FIGS. 1 and 2 operates in the following manner:

The measuring wheels 1 and 2 are driven in rotation by flowing medium, and the bar magnets 25 and 26 inserted in the measuring wheel 2 apply upon the pulse wires 34 of the probe head 14 alternatingly differently directed and differently strong magnetic fields. Thereby strong magnetic pulses, as known in accordance with the Wiegand principle, are produced in the pulse wires 34 and converted in the receiver coil 32 into electrical pulses. The magnetic fields of the bar magnets 25 and 26 are transferred through the tubular magnet yoke 35 to the probe head 14, whereby the field action upon the pulse wires 34 is amplified and the run of the field strength over the rotary angle of the measuring wheel is steeper. Thereby the influence of a different reaction of the individual pulse wires 34 is considerably reduced.

Figure 3:
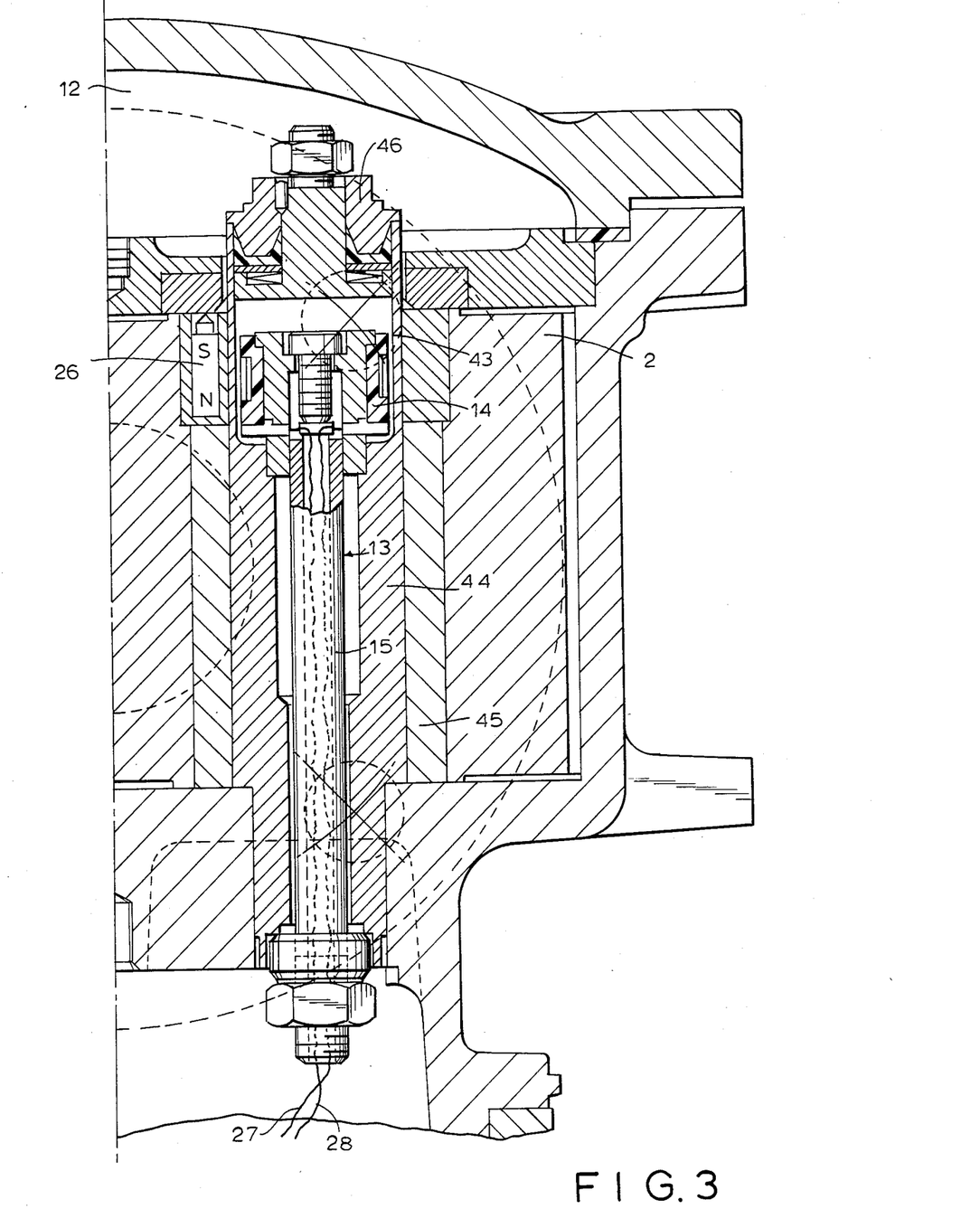
FIG. 3 is a view showing another oval wheel counter in accordance with the invention in a longitudinal section with a probe having an increased probe head arranged in a thin-walled portion of the hollow axle.

In flow meters of greater nominal width the hollow axle is formed only over a small part of its length as a thin-walled structure because of strength considerations. In this case, as shown in FIG. 3, the probe head 14 is arranged in this thin-walled region 43, while the thicker probe shaft 15 is inserted into a hollow space of a smaller diameter in the axle 4. The probe head 14 which has a greater diameter than the probe shaft 15 also carries outwardly the pulse wires and concentrically thereto the receiver coil and the magnet yoke corresponding to those of FIG. 2. The hollow axle 4 in its non-expanded part 44 has a wall thickness with a sufficient strength, and the bearing bush 45 extends only over the not-expanded part of the hollow axle 4, so that the bar magnets 25 and 26 inserted in the measuring wheel 2 can be moved closer to the probe head 14. Since the probe 13 with the expanded probe head 14 can be inserted into the hollow axle only from the side of the cover chamber 12 which is normally under operative pressure, the thin-walled region 43 of the hollow axle is closed by a pressure-tight closure 46 from the pressure side.

Figure 4:
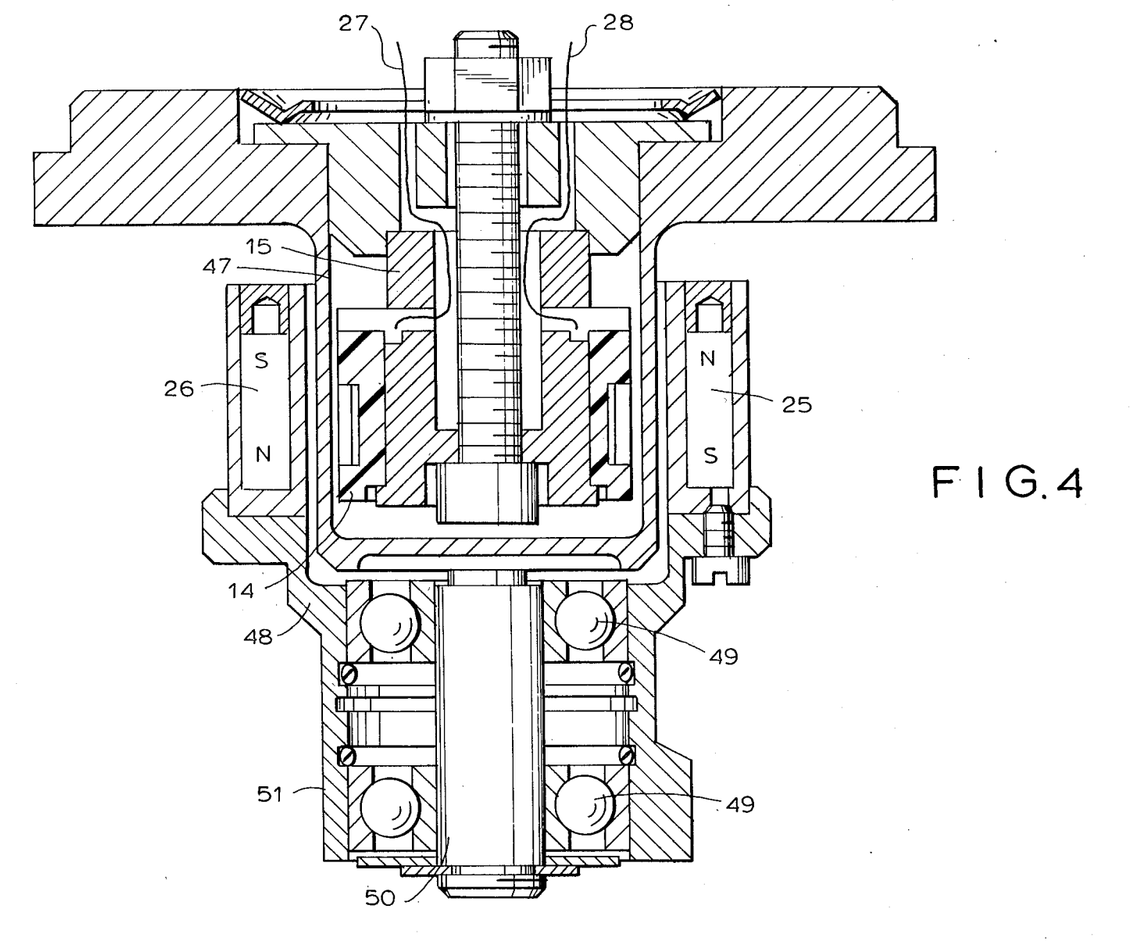
FIG. 4 is a view showing a probe which is located in the interior of a hollow axle of a rotor driven by the measuring wheel

In the embodiment shown in FIG. 4, the pulse wire sensor 13 with the probe head 14 and the probe shaft 15 is inserted into a fixed hollow axle 47 of a rotor 48. The rotor 48 is rotatably supported via a ball bearing 49 on an axle trunnion 50. The rotary drive is performed from one of the measuring wheels via a not-shown driving fork which engages two opposite flattened sides 51 of the rotor 48.

Figure 5:
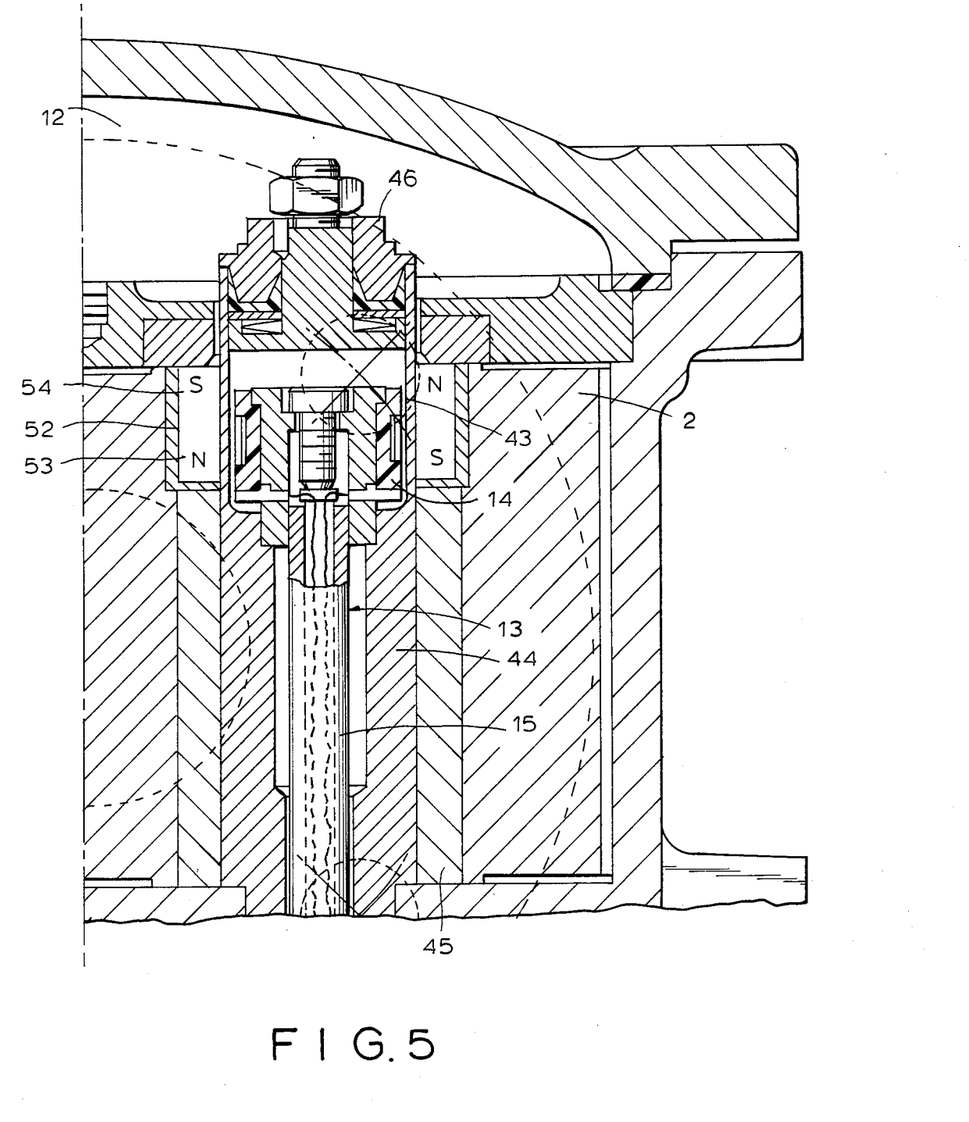
FIG. 5 is a view showing the inventive pulse receiver in accordance with a further embodiment of the invention.

As can be seen from FIG. 5, instead of the bar magnets 26, a magnet ring 52 is provided. The magnet ring 52 is composed of a magnetizable material and arranged in the measuring wheel 2. It is magnetized in correspondence with magnet lines 53 in an axis-parallel direction and subdivided into zone pairs 54. The zones pairs 54 are magnetized in opposite directions and with different strengths.

Figure 6:
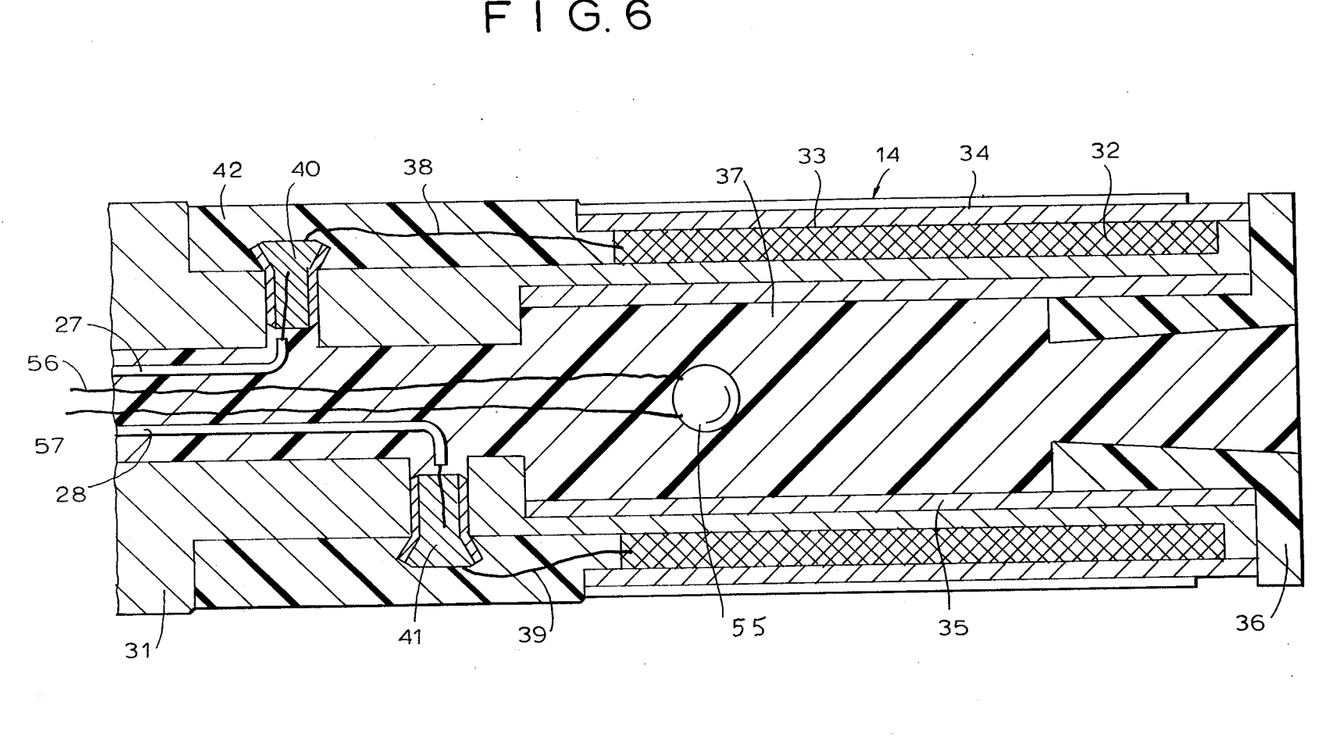
FIG. 6 shows the inventive pulse receiver with the probe provided with temperature sensing means.

FIG. 6 shows a temperature sensor 55 provided in the probe head 14. Signal conductors 56 and 57 are connected with the temperature sensor 55 and together with the signal conductors 22, 28 of the pulse wire sensor 18 lead outwardly.

It will be understood that each of the elements described above, or two or more together, may also find a useful application In other types of constructions differing from the types described above.

While the invention has been illustrated and described as embodied in an electromagnetic pulse receiver for a flow meter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An electromagnetic pulse receiver for a flow meter, comprising a measuring wheel element to be driven in rotation by a flowing medium; a stationary axle which rotatably supports said measuring wheel element and is at least partially formed as a hollow axle with a cylindrical hollow space; a pulse wire sensor arranged in said cylindrical hollow space of said hollow axle and formed as a cylindrical probe, said probe having a probe head which carries a plurality of cylindrically arranged pulse wires, a receiver coil, and a cylindrical magnet yoke concentrically located inside said receiver coil, said probe also having an outwardly extending probe shaft with inwardly located electrical pulse conductors and an outwardly located holding element for holding said probe shaft; and magnet means including at least one pair of magnets located near said hollow axle in said measuring wheel element, said magnet pair extending in a direction parallel to said hollow axle and magnetized in said direction with opposite polarity so as to encircle said probe head during the rotation of said measuring wheel element, so that during the rotation of said measuring wheel element magnetic pulses are generated in said pulse wires of said probe head due to the application upon said pulse wires from said magnet pair of alternatingly differently directed and differently strong magnetic fields, which magnetic pulses are converted in said receiver coil into electric pulses whose number is indicative of a quantity of a medium flowing through the flowmeter.

2. An electromagnetic pulse receiver as defined in claim 1, wherein said measuring wheel element includes a measuring wheel rotatably supported on said hollow axle, said cylindrical probe being arranged in said cylindrical hollow space of said hollow axle which supports said measuring wheel.

3. An electromagnetic pulse receiver as defined in claim 1; and further comprising a rotor which is driven by said measuring wheel element, said rotor being rotatably supported on said hollow axle, said cylindrical probe being arranged in said cylindrical hollow space of said hollow axle which supports said rotor.

4. An electromagnetic pulse receiver as defined in claim 1, wherein said hollow axle is formed completely hollow so as to form said cylindrical hollow space, said cylindrical probe being arranged in said cylindrical hollow space of said completely hollow axle.

5. An electromagnetic pulse receiver as defined in claim 1, wherein said probe shaft has a plurality of grooves having different depth, said hollow axle having a projection; and further comprising a housing which contains said measuring wheel element and said stationary axle, said holding element provided on said probe shaft being formed as a safety ring inserted in one of said grooves and abutting against said projection for fixing said probe on said housing; and a screw which holds said safety ring in a respective one of said grooves.

6. An electromagnetic pulse receiver as defined in claim 1, wherein said measuring wheel element has a ring shaped space, said magnet means being arranged in said ring-shaped space of said measuring wheel element, while said pulse wire sensor formed as said probe is accommodated in said cylindrical hollow space of said hollow axle, said magnet means being formed as a magnet ring having an axis and magnetized in an axis-parallel direction, said magnet ring including at least one pair of zones which form said pair of magnets, whereby the magnets are magnetized alternatingly in opposite directions and with different strength.

7. A pulse receiver as defined in claim 1; and further comprising temperature sensing means including a temperature sensor arranged in the interior of said pulse wire sensor formed as said probe.

8. A pulse receiver as defined in claim 7; and further comprising a signal conduit which transmit pulses from said receiver coil of said probe end and extends from said probe end outwardly; and a further signal conduit which also extends from said temperature sensor outwardly.

9. A pulse receiver as defined in claim 1, wherein said magnet pair of said magnet means is formed as a pair of bar-shaped magnets located in said measuring wheel element.

10. An electromagnetic pulse receiver as defined in claim 3, wherein said magnet pair of said magnet means is located in said rotor which is driven by said measuring wheel element.

* * * * *